United States Patent [19]

Nieda et al.

[11] 4,366,409
[45] Dec. 28, 1982

[54] HALOGEN INCANDESCENT LAMP

[75] Inventors: Yasuhiro Nieda, Yokosuka; Kiyokazu Honda, Zushi; Hidehiro Shinada, Yokohama, all of Japan

[73] Assignee: Tokyo Shibaura Denki Kabushiki Kaisha, Kawasaki, Japan

[21] Appl. No.: 149,699

[22] Filed: May 14, 1980

[30] Foreign Application Priority Data

May 24, 1979 [JP] Japan ................... 54-63220

[51] Int. Cl.$^3$ ........................................... H01J 17/16
[52] U.S. Cl. .................................. 313/221; 313/222; 313/252
[58] Field of Search ................... 313/252, 222, 221

[56] References Cited

U.S. PATENT DOCUMENTS

| | | |
|---|---|---|
| 3,496,401 | 2/1970 | Dumbaugh, Jr. . |
| 3,798,491 | 3/1974 | Malm .............................. 313/222 X |
| 3,829,729 | 8/1974 | Westlund, Jr. et al. ......... 313/222 X |
| 3,978,362 | 8/1976 | Dumbaugh, Jr. et al. . |
| 4,074,167 | 2/1978 | van den Broek et al. .......... 313/222 |
| 4,105,826 | 8/1978 | Thomas ........................... 313/222 X |

FOREIGN PATENT DOCUMENTS 49-89381  8/1974  Japan .

Primary Examiner—Paul L. Gensler
Attorney, Agent, or Firm—Cushman, Darby & Cushman

[57] ABSTRACT

A halogen incandescent lamp performing halogen cycle in operation, comprising a bulb formed of light-transmitting material in which gas containing halogen atoms and inert gas are enclosed, a tungsten filament with working temperature of 2,800° K. or more contained in the bulb, at least a pair of lead-in wires connected to or integrally formed on both ends of the tungsten filament, respectively, and having a part sealed in the bulb, the lamp characterized in that the light-transmitting material is aluminosilicate glass having a strain point of 660° C. or higher and an average thermal expansion coefficient of $41 \times 10^{-7}$ to $48 \times 10^{-7}$ cm/cm/°C. at a temperature of 100° to 300° C., and that at least filament-side seal portions of the lead-in wires have a diameter of 0.2 to 0.6 mm.

11 Claims, 3 Drawing Figures

U.S. Patent   Dec. 28, 1982   4,366,409
FIG. 1A
FIG. 1B
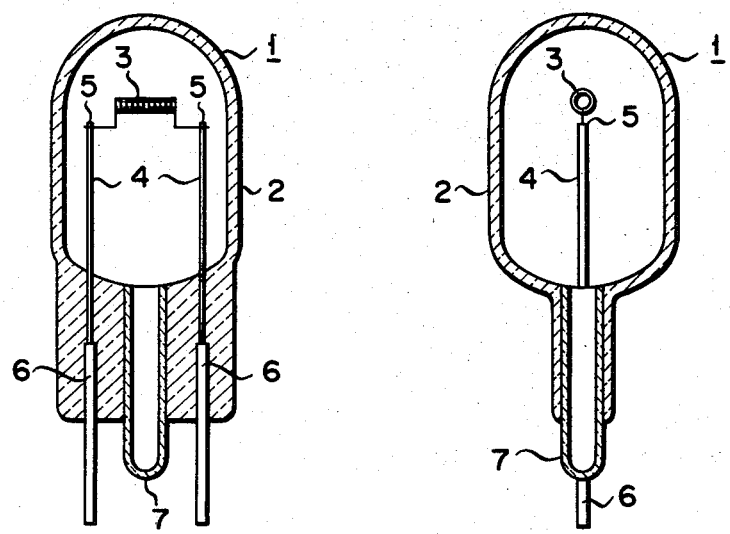
FIG. 2
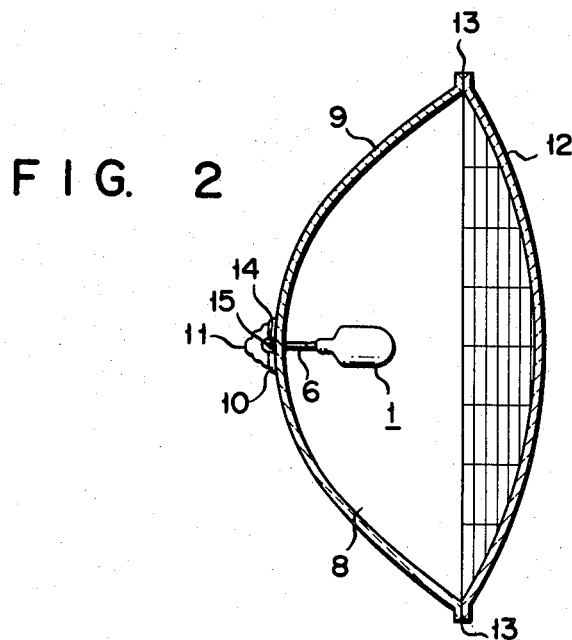

HALOGEN INCANDESCENT LAMP

This invention relates to halogen incandescent lamps, more specifically to halogen incandescent lamps using aluminosilicate glass for bulb material.

As compared with ones containing no halogen, tungsten-filament incandescent lamps with halogen sealed therein are improved in compactness, efficiency and life performance, performing halogen cycles which will prevent bulb blackening till the end of the life. Accordingly, they are utilized in various fields of illumination.

In one such halogen incandescent lamp, the temperature of a glowing bulb needs to be kept at a high temperature of approximately 250° C. or higher lest tungsten halide should stick to the inside wall of the bulb during halogen cycles. For the material of the bulb, therefore, there has been used quartz glass or high silica glass which can resist high heat load.

Although quartz glass has favorable properties for the material for incandescent lamps, such as high heat-resisting property and tendency to discharge hardly any impurity gas at high temperature, it has a very small thermal expansion coefficient—$5.6 \times 10^{-7}$ cm/cm/°C. at 0° to 300° C. Normally, a filament is connected with a lead-in wire for the transmission of electric current from a power source. Part of the lead-in wire is sealed in the bulb, and the thermal expansion coefficients of materials of the lead-in wire and bulb need be approximate to each other. Even with molybdenum having a relatively small thermal expansion coefficient, however, the value of such coefficient is $37 \times 10^{-7}$ to $53 \times 10^{-7}$ cm/cm/°C. at 100° to 300° C., which is considerably greater than that of quartz glass. When using quartz glass for the bulb material, therefore, molybdenum foil of 20 to 30-μm thickness is used for the seal portion, and inner and outer lead-in wires are connected to both ends of the molybdenum foil, respectively.

Manufacture of such halogen incandescent lamp, however, requires very high techniques for providing processing means for manufacturing thin foil of molybdenum and means for electrically connecting the inner and outer lead-in wires by welding or some other method, as well as a considerably large number of processes. Further, in a process to seal the molybdenum foil to a quartz glass bulb by pinch-seal method, there is such a manufactural requirement that sealing should be accomplished in a short time of one second or thereabouts after the bulb is heated to high temperature, since quartz glass has a high melting point and is quick to harden after softening. Moreover, the molybdenum foil is highly susceptible to oxidation at high temperature, so that sealing must be performed after taking a measure to meet such situation. In addition, such sealing operation would require a high technique.

Furthermore, it is difficult to prevent perfectly oxidation of the molybdenum foil in the sealing operation, so that scanty oxide films may be formed during the sealing operation on the surface of the molybdenum foil and at portions exposed to the air outside the lamp. Formation of these oxide films will be expedited by a temperature rise caused when the lamp is turned on. In consequence, the molybdenum foil suffers breakage due to oxidation, which is a fatal defect. While the enclosed gas usually contains hydrogen to prevent halogen from etching the filament or lead-in wire, such hydrogen will possibly leak out through quartz glass.

Since high silica glass has substantially the same physical properties as quartz glass, the use of the molybdenum foil is required also when high silica glass is used for the bulb material, leaving the same defect.

Meanwhile, there may be proposed the use of hard or semi-hard glass for the bulb material which, unlike quartz glass and high silica glass, has a thermal expansion coefficient approximate to that of molybdenum. In this case, the aforesaid defect may be eliminated because molybdenum wires may be used in place of the molybdenum foil for the seal material. Hereupon, if the temperature of the bulb as a whole is kept at 250° C. or higher which is needed for the performance of halogen cycle, the bulb temperature will locally exceed 500° C. Since the strain point of hard or semi-hard glass, however, is lower than 500° C., the bulb may be damaged or broken.

Thus, the molybdenum foil will have to be used for the seal metal if the bulb material is selected in consideration of heat-resisting property, while such heat-resisting property will become a problem if the bulb material is selected on the basis of the availability of molybdenum wires.

An object of this invention is to provide a halogen incandescent lamp as a solution to all the aforementioned problems or drawbacks of the prior art halogen incandescent lamps.

Another object of this invention is to provide a long-life halogen incandescent lamp ensuring high manufacturing efficiency and low material cost, and yet exhibiting equivalent or superior characteristics to those of their prior art incandescent lamps.

According to this invention, there is provided a halogen incandescent lamp performing halogen cycle in operation, comprising a bulb formed of light-transmitting material in which gas containing halogen atoms and inert gas are enclosed, a tungsten filament with working temperature of 2,800 °K or more contained in the bulb, at least a pair of lead-in wires connected to or integrally formed on both ends of the tungsten filament, respectively, and having a part sealed in the bulb, the lamp characterized in that the light-transmitting material is aluminosilicate glass having a strain point of 660° C. or higher and an average thermal expansion coefficient of $41 \times 10^{-7}$ to $48 \times 10^{-7}$ cm/cm/°C. at a temperature of 100° to 300° C., and that at least filament-side seal portions of the lead-in wires have a diameter of 0.2 to 0.6 mm.

This invention can be more fully understood from the following detailed description when taken in conjunction with the accompanying drawing, in which:

FIG. 1A is a front sectional view of a halogen incandescent lamp according to an embodiment of this invention;

FIG. 1B is a side sectional view of the halogen incandescent lamp of FIG. 1A; and FIG. 2 is a sectional view of a sealed beam headlamp for an automobile incorporating the halogen incandescent lamp of FIGS. 1A and 1B.

This invention is based on a view that all the drawbacks of the prior art halogen incandescent lamps may be eliminated by using molybdenum or tungsten wires as lead-in wires to be sealed in a bulb of a halogen incandescent lamp, and aluminosilicate glass as glass material with a thermal expansion coefficient approximate to that of the molybdenum or tungsten wires and a relatively high strain point.

The aluminosilicate glass forming the bulb of the halogen incandescent lamp of this invention has the following physical properties.

Strain point: 660° C. or higher.
Softening point: 900° to 1,050° C.
Average thermal expansion coefficient (at 100° to 300° C.): $41 \times 10^{-7}$ to $48 \times 10^{-7}$ cm/cm/°C.

The above properties of the aluminosilicate glass can be obtained by defining the composition of the glass material as follows:

$SiO_2$: 55 to 65 wt. %
$Al_2O_3$: 15 to 22 wt. %
CaO: 5 to 10 wt. %
MgO: 6 to 10 wt. %
$B_2O_3$: 3 to 6 wt. %
Accompanying oxide: Very small amount
Residual flux: Very small amount
Residual clarifying agent: Very small amount Since the bulb formed of the aluminosilicate glass with the above physical properties and/or composition has a thermal expansion coefficient approximate to that of molybdenum ($37 \times 10^{-7}$ to $53 \times 10^{-7}$ cm/cm/°C.) or tungsten ($45 \times 10^{-7}$ cm/cm/°C.), it is unnecessary to foliate the seal portions of the lead-in wires in the bulb. Further, since the strain point of the bulb material is 660° C. or higher, the bulb will hardly suffer any undesirable cracks even if it is heated to a temperature required for the performance of halogen cycle, i.e. 250° C. or higher.

Tending to soften at approximately 1,000° C., the aforementioned aluminosilicate glass ensures very high processibility for bulbs, and improves the sealing efficiency of the lead-in wires. The softening point of the aluminosilicate glass is about 700° C. lower than that of quartz glass.

Thus, the use of the aluminosilicate glass with the aforesaid physical properties as the bulb material has first enabled the manufacture of halogen incandescent lamps without using molybdenum foil and quartz glass that are poor in operating efficiency.

A bulb of approximately 8-mm diameter and 25-mm length was formed by using such aluminosilicate glass, a tungsten filament of e.g. 12 V, 40 W (3.3 A) was sealed in the bulb through the aid of molybdenum lead-in wires of 0.3-mm diameter so that the temperature of the inside wall of the bulb, when lighted, would reach 250° C. or higher, and thus a halogen incandescent lamp was manufactured. When this lamp was lighted, the lead-in wires suffered no damage. With the prior art lamps using molybdenum foil, overheating may be caused by generation of heat at the junction of the molybdenum foil and an inner or outer lead-in wire due to the high resistance at such junction, as well as by heating of the bulb itself attributable to production of heat at the filament. As a result, the molybdenum foil is oxidized by oxygen in air to be broken. The lamp of this invention, however, is free from such trouble because it utilizes molybdenum wires with lower resistance than that of the molybdenum foil.

However, if the diameter of the lead-in wires at the seal portions is unnecessarily large, there will be a danger of breakdown of glass at the lead-in wire seal portions of the halogen incandescent lamp whose bulb temperature will reach 200° C. or higher, despite the proximity between the thermal expansion coefficients of the materials of the lead-in wires and the bulb. Accordingly, the diameter of the lead-in wire at the seal portions must be 0.2 to 0.6 mm. Especially in the case of molybdenum lead-in wires, the diameter should preferably be limited to a range of 0.4 to 0.6 mm since molybdenum would be highly compatible with aluminosilicate glass to ensure high sealing strength. As for tungsten lead-in wires, they have a small thermal expansion coefficient and high mechanical strength, so that they should preferably have a diameter of 0.2 to 0.4 mm.

In the case of the tungsten lead-in wires, both ends of a tungsten filament may be extended with a given diameter so that the tungsten filament may perform the function of such lead-in wires besides its original function. Thus, it is unnecessary to use separate lead-in wires, and the numbers of processes and materials may be reduced.

Bromine is preferably used as the halogen to be contained in the bulb. Preferably, moreover, $0.1 \times 10^{-7}$ to $0.5 \times 10^{-6}$ gram molecule of bromine is used for each 1 cc of bulb capacity. If the amount of bromine is less than $0.1 \times 10^{-7}$ gram molecule/cc, halogen cycle will be retarded to quicken blackening that is caused by evaporated tungsten which comes out on the inside wall of the bulb without returning to the filament, thereby shortening the life of the lamp and substantially deteriorating luminous flux. If the amount of bromine is more than $0.5 \times 10^{-6}$ gram molecule/cc, on the other hand, extra portion of bromine will be condensed on the tungsten filament when the lamp is off or deposited on the surfaces of the lead wires which have not yet been heated to the full when the lamp is on. The condensed bromine will etch the filament and lead wires to reduce their strength and shorten the life of the lamp. As for other halogen elements, they are not suitable for this purpose; iodine tends to be condensed to color the bulb while the lamp is off, and chlorine will etch the filament and lead-in wires to a great degree.

It is necessary only that the above-mentioned amount of bromine should exist in the bulb, and a bromide such as hydrogen bromide or hydrocarbon bromide may be enclosed in the bulb to fulfill such requirement. Preferably, hydrogen is contained in the gas enclosed in the bulb in order to prevent halogen from etching the filament and lead-in wires. Hydrogen may be used in the form of a single substance or hydrogen bromide or hydrocarbon bromide.

Now there will be described an embodiment of this invention with reference to the accompanying drawings.

FIGS. 1A and 1B are front and side views showing partial sections of a halogen incandescent lamp used for a sealed beam headlamp for an automobile, respectively. A halogen incandescent lamp 1 includes a bulb 2 and a tungsten filament 3 incorporated in the bulb 2. The bulb 2, which is made of aluminosilicate glass containing 57 wt. % of $SiO_2$, 20 wt. % of $Al_2O_3$, 8 wt. % of MgO, 6 wt. % of CaO, 4 wt. % of $B_2O_3$, and very small amounts of accompanying oxides and residuals, is a bottomed cylinder with an inside diameter of approximately 8 mm and a length of approximately 25 mm. The tungsten filament 3 has ratings of 12 V and 60 W so that the working temperature may be approximately 2,800° K. The tungsten filament 3 is supported by respective one ends 5 of a pair of inner lead-in wires 4 of molybdenum with a diameter of approximately 0.3 mm. The other ends of the inner lead-in wires are welded to outer lead-in wires 6 formed of nickel wires of about 1.0-mm diameter. A portion of the bulb 2 near fixed portions between these inner and outer lead-in wires 4 and 6 is pinch-sealed. A gas mixture of $0.3 \times 10^{-7}$ gram atom/cc of bromine and inert gas such as argon is enclosed in the bulb to attain the pressure inside the bulb of approximately 4 atm. Pipe 7 is utilized to evacuate the bulb and for introducing the gas mixture, after which, pipe 7 is sealed as shown in FIGS. 1A and 1B.

The on-state characteristics of the halogen incandescent lamp of the aforesaid construction are as follows:

Initial characteristics:
  Tungsten filament temperature: 3,200° K.
  Efficiency: 23 lumen/W
Lamp life: 500 hours These characteristics are equivalent to or higher than those of a halogen incandescent lamp using quartz glass for bulb material and molybdenum foil for seal portion between bulb and lead-in wire, revealing that the lamp of this invention fully secures the distinctive features of a halogen incandescent lamp.

The gas pressure inside the bulb is preferably 4 to 10 atm. as the total pressure or the sum of the pressure of halogen gas and the pressure of inert gas, e.g. argon. If the gas pressure is lower than 4 atm., evaporation of the tungsten filament is accelerated when the lamp is lighted, thereby shortening the lamp life. If the gas pressure is higher than 4 atm., the evaporation of the tungsten filament is restrained, though heat loss of the filament caused by the gas is increased to reduce the efficiency. Unless the gas pressure exceeds 10 atm., however, the improvement in efficiency due to the suppression of the evaporation of the tungsten filament surpasses the reduction in the efficiency attributable to the heat loss, so that the efficiency is improved as the gas pressure increases. If the gas pressure exceeds 10 atm., the reduction in the efficiency caused by the heat loss surpasses the improvement thereof due to the suppression of evaporation, so that the efficiency is deteriorated as the gas pressure increases. The gas pressure mentioned here is a value obtained when the lamp is off. If the off-state gas pressure is higher than 10 atm., the gas pressure may reach 30 atm. or higher when the lamp is lighted, possibly causing breakdown of the bulb. Also for this reason, it is advisable to control the gas pressure so as not to exceed 10 atm.

According to the halogen incandescent lamp of this invention, as described above in detail, hydrogen enclosed together with the halogen gas in the bulb is always kept at a fixed amount without leaking out through the bulb when the lamp is lighted, unlike the case of the quartz glass bulb, so that etching of the inner lead-in wires by the halogen gas is minimized by the etching preventive effect of hydrogen. Thus, there may be obtained a long-life halogen incandescent lamp. Moreover, since the halogen incandescent lamp of this invention enables use of cheap, conventional materials such as aluminosilicate glass and molybdenum wires, as well as of substantially the same manufacturing processes as the processes for other lamps, the cost of production can be reduced as compared with the manufacture of halogen incandescent lamps using expensive low-workability materials such as quartz glass and molybdenum foil. Furthermore, the lamp of this invention has characteristics equivalent to or higher than those of the conventional ones.

Although the above-mentioned embodiment of this invention is an example of a halogen incandescent lamp used for a sealed beam headlamp for an automobile, the lamp of the invention is not limited to such embodiment, and the invention may also be applied to various other uses including floodlighting lamps, projection lamps, photoflood lamps, general-use interior illumination lamps, etc. Moreover, the invention may further be applied to lamps having a plurality of tungsten filaments in a single bulb, such as headlamps for automobiles.

FIG. 2 is a side sectional view of a sealed beam headlamp for an automobile incorporating the halogen incandescent lamp of the aforementioned embodiment. In FIG. 2, a sealed beam headlamp 8 is mainly composed of a reflector 9, a lens 12, and the halogen incandescent lamp 1. An outer end portion of the other lead-in wire 6 of the halogen incandescent lamp 1 is fixed by e.g. brazing to a ferrule 11 which is fixedly fitted in a boss 10 of the reflector 9. The reflector 9 and lens 12 are sealed by welding their respective peripheral portions 13 together. Air inside the head lamp 8 is exhausted through an exhaust tube 14, inert gas and other gases are enclosed in the lamp 8, and then a sealing end 15 is sealed.

In the above-mentioned construction, the outer lead-in wire 6 of the halogen incandescent lamp 1 may favorably be used both as a supporting wire and as a lead-in wire by inserting the end portion of the outer lead-in wire 6 into the interior of the ferrule 11 and fixing it by brazing.

If the outer lead-in wire is formed of a nickel wire with plasticity, the seal portion in the bulb will be subjected to less mechanical shock when adjusting the luminous center of the halogen incandescent lamp 1 to the focus of the reflector 9.

Using the halogen incandescent lamp for its light source, the car headlamp formed in the aforesaid manner ensures an improvement in efficiency by 35%, as compared with a headlamp which uses a conventional incandescent lamp for the light source. This suggests that a halogen incandescent lamp of approximately 35 W may be a substantially equivalent substitute for a conventional incandescent lamp of 60 W. Accordingly, the halogen incandescent lamps of this invention may greatly contribute to reduction of power consumption particularly when they are used for headlamps of automobiles. With respect to life performance as an important practical condition, moreover, the halogen incandescent lamps of the invention are equivalent or superior to the prior art incandescent lamps.

What we claim is:

1. A halogen incandescent lamp performing a halogen cycle in operation, comprising a bulb formed of light-transmitting material in which gas containing halogen atoms and inert gas are enclosed, a tungsten filament with working temperature of 2,800° K or more contained in said bulb, at least a pair of lead-in wires connected to or integrally formed on both ends of said tungsten filament, respectively, and having a part sealed in said bulb, said lamp characterized in that said light-transmitting material is aluminosilicate glass having a strain point of 660° C. or higher and an average thermal expansion coefficient of $41 \times 10^{-7}$ to $48 \times 10^{-7}$ cm/cm/°C. at a temperature of 100° to 300° C., and that at least filament-side seal portions of said lead-in wires are molybdenum wires having a diameter of 0.4 to 0.6 mm.

2. A halogen incandescent lamp performing a halogen cycle in operation, comprising a bulb formed of light-transmitting material in which gas containing halogen atoms and inert gas are enclosed, a tungsten filament with working temperature of 2,800° K. or more contained in said bulb, at least a pair of lead-in wires connected to or integrally formed on both ends of said tungsten filament, respectively, and having a part sealed in said bulb, said lamp characterized in that said light-transmitting material is aluminosilicate glass having a strain point of 660° C. or higher and an average thermal expansion coefficient of $41 \times 10^{-7}$ to $48 \times 10^{-7}$ cm/cm/°C. at a temperature of 100° to 300° C., and that at least filament-side seal portions of said lead-in wires are tungsten wires having a diameter of 0.2 to 0.4 mm.

3. A halogen incandescent lamp according to claim 1 or 2 characterized in that the principal ingredients of said aluminosilicate glass are as follows:

$SiO_2$: 55 to 65 wt. %
$Al_2O_3$: 15 to 22 wt. %
CaO: 5 to 10 wt. %
MgO: 6 to 10 wt. %
$B_2O_3$: 3 to 6 wt. %

4. A halogen incandescent lamp according to any one of claims 1 or 2 characterized in that said pair of lead-in wires are composed of a pair of inner lead-in wires and a pair of outer lead-in wires connected with each other at portions where said lead-in wires are sealed in said bulb, said pair of inner lead-in wires being connected respectively to both ends of said filament, and said pair of outer lead-in wires being led out of said bulb.

5. A halogen incandescent lamp according to claim 4 characterized in that said outer lead-in wires are made of nickel.

6. A halogen incandescent lamp according to claim 1 or 2 characterized in that the total pressure of the gas enclosed in said bulb is 4 to 10 atm.

7. A halogen incandescent lamp according to claim 1 or 2 characterized in that said halogen is bromine.

8. A halogen incandescent lamp according to claim 7 characterized in that the atomic weight of said bromine is $0.1 \times 10^{-7}$ to $0.5 \times 10^{-6}$ gram atom per 1 cc of bulb capacity.

9. A halogen incandescent lamp according to claim 7 characterized in that said gas containing halogen atoms further contains hydrogen atoms.

10. A halogen incandescent lamp according to claim 9 characterized in that said gas containing halogen atoms is a gas mixture of bromine gas and hydrogen gas.

11. A halogen incandescent lamp according to claim 9 characterized in that said gas containing halogen atoms is formed of at least one member selected from the group consisting of hydrogen bromide and hydrocarbon bromide.

* * * * *